(12) United States Patent
Takahashi et al.

(10) Patent No.: US 8,449,206 B2
(45) Date of Patent: May 28, 2013

(54) FOCAL PLANE SHUTTER AND OPTICAL APPARATUS

(75) Inventors: Hiroshi Takahashi, Chiba (JP); Seiichi Oishi, Chiba (JP)

(73) Assignee: Seiko Precision Inc., Naroshino-shi (JP)

( * ) Notice: Subject to any disclaimer, the term of this patent is extended or adjusted under 35 U.S.C. 154(b) by 0 days.

(21) Appl. No.: 13/455,393

(22) Filed: Apr. 25, 2012

(65) Prior Publication Data

US 2012/0213505 A1    Aug. 23, 2012

Related U.S. Application Data

(63) Continuation of application No. PCT/JP2011/054079, filed on Feb. 24, 2011.

(30) Foreign Application Priority Data

Jul. 12, 2010  (JP) .................................. 2010-157609

(51) Int. Cl.
  *G03B 9/60*  (2006.01)
(52) U.S. Cl.
  CPC ........................ *G03B 9/60* (2013.01)
  USPC ............................. 396/489; 396/456; 396/472
(58) Field of Classification Search
  CPC ....................................................... G03B 9/60
  USPC ................... 396/235, 454, 456, 472
  See application file for complete search history.

(56) References Cited

U.S. PATENT DOCUMENTS

| 4,268,154 | A | * | 5/1981 | Daitoku | 396/264 |
| 4,395,105 | A | * | 7/1983 | Senuma | 396/456 |
| 5,392,085 | A | | 2/1995 | Tanabe | |
| 6,850,281 | B2 | * | 2/2005 | Takahashi | 348/363 |
| 7,380,999 | B2 | * | 6/2008 | Toyoda | 396/466 |
| 8,212,918 | B2 | * | 7/2012 | Tanaka et al. | 348/362 |
| 2010/0067897 | A1 | * | 3/2010 | Sakai | 396/484 |

FOREIGN PATENT DOCUMENTS

| JP | 6-51372 | 2/1994 |
| JP | 10-319473 | 12/1998 |
| JP | 2000-258816 | 9/2000 |
| JP | 2001235779 A * | 8/2001 |
| JP | 2006064974 A * | 3/2006 |
| JP | 2007-17581 A1 | 1/2007 |
| JP | 2008-256844 A1 | 10/2008 |
| JP | 2009-122557 A1 | 6/2009 |

OTHER PUBLICATIONS

International Search Report for International Application No. PCT/JP2011/054079 dated May 31, 2011.

* cited by examiner

*Primary Examiner* — Clayton E Laballe
*Assistant Examiner* — Leon W Rhodes, Jr.
(74) *Attorney, Agent, or Firm* — Kratz, Quintos & Hanson, LLP

(57) ABSTRACT

A focal plane shutter includes: a board including an opening; a drive lever swingably supported by the board, biased from a start end to a terminal end of a swingable range by a drive spring, and driving blades opening and closing the opening; and a set member rotating in a first direction to position the drive lever at the start end, and then rotating in a second direction.

7 Claims, 11 Drawing Sheets

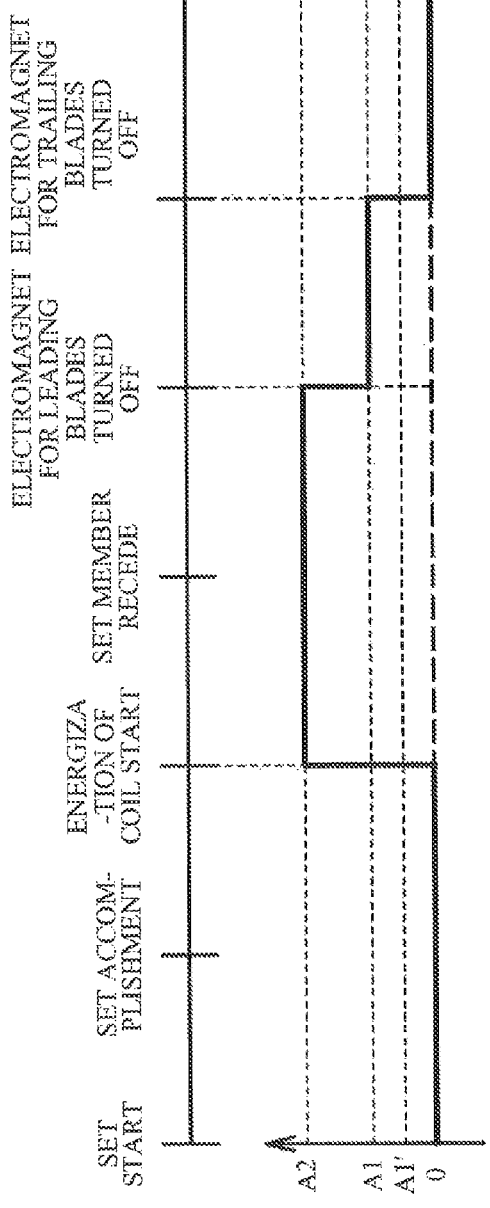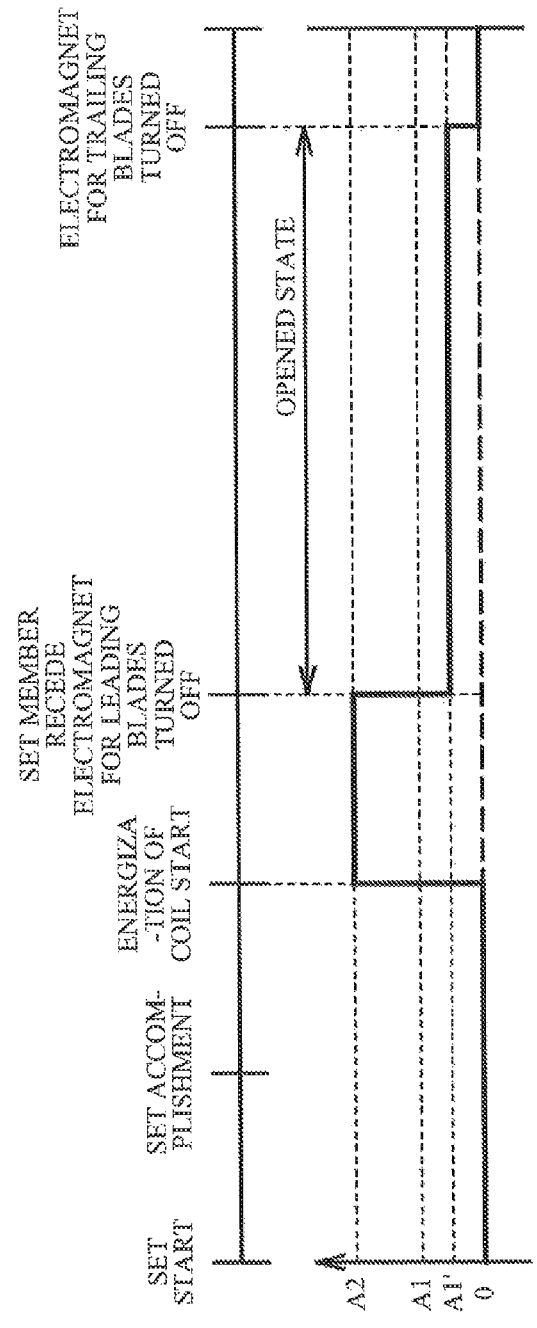

FOCAL PLANE SHUTTER AND OPTICAL APPARATUS

CROSS-REFERENCE TO RELATED APPLICATION

This application is a continuation of and claims priority to International Patent Application No. PCT/JP2011/054079 filed on Feb. 24, 2011, which claims priority to Japanese Patent Application No. 2010-157609 filed on Jul. 12, 2010, subject matter of these patent documents is incorporated by reference herein in its entirety.

BACKGROUND (i) Technical Field

The present invention relates to focal plane shutters and optical apparatuses.

(ii) Related Art

Japanese Unexamined Patent Application Publication No. 2009-122557 discloses an optical apparatus employing a focal plane shutter. The focal plane shutter is equipped with a board including an opening; blades opening and closing the opening; and a drive lever rotatably supported by the board and driving the blades.

The drive lever is biased by a drive spring, and rotated from a start end to a terminal end of a swingable range by a biasing force of the drive spring. The drive lever abuts an end portion of an escape slot provided in the board, and then stops at the terminal end of the swingable range. At this time, an impact is applied to the whole focal plane shutter. Therefore, the load applied to the drive lever or the whole focal plane shutter is a factor that reduces the reliability of performance of the focal plane shutter for long-term use. Further, the biasing force of the drive spring tends to increase in accordance with an increase in the speed of the focal plane shutter. Therefore, besides the above mentioned impact, there is a problem of an increase in the consumption current resulting from an increase in an amount of current in an electromagnet for holding the drive lever at a given position.

SUMMARY

It is therefore an object of the present invention to provide a focal plane shutter that suppresses an impact caused by a drive lever. Further, it is another object of the present invention, according to the above object, to provide a focal plane shutter that suppresses the consumption current by suppressing an amount of current in an electromagnet for holding the drive lever.

According to an aspect of the present invention, there is provided a focal plane shutter including: a board including an opening; a drive lever swingably supported by the board, biased from a start end to a terminal end of a swingable range by a drive spring, and driving blades opening and closing the opening; and a set member rotating in a first direction to position the drive lever at the start end, and then rotating in a second direction; wherein the drive lever moves from the start end to the terminal end, while the drive lever is abutting the set member rotating in the second direction so as to reduce a biasing force of the drive spring, the blades include leading blades and trailing blades, the drive lever includes a leading-blades drive lever and a trailing-blades drive lever respectively driving the leading blades and the trailing blades, the trailing-blades drive lever is adsorbed to and held by an electromagnet for the trailing blades, the leading-blades drive lever moves from the start end to the terminal end, while the leading-blades drive lever is abutting the set member rotating in the second direction so as to reduce the biasing force of the drive spring, the set member is rotatable in the second direction in first and second modes different from each other, the leading-blades drive lever moves from the start end to the terminal end while being spaced from the set member in the first mode, the leading-blades drive lever moves from the start end to the terminal end while abutting the set member in the second mode, and an amount of current in the electromagnet for the trailing blades is set lower in the second mode than in the first mode.

BRIEF DESCRIPTION OF THE DRAWINGS

FIGS. 10A and 10B are timing charts illustrating the operation of the set member and the energization state of electromagnets.

DETAILED DESCRIPTION

Figure 1:
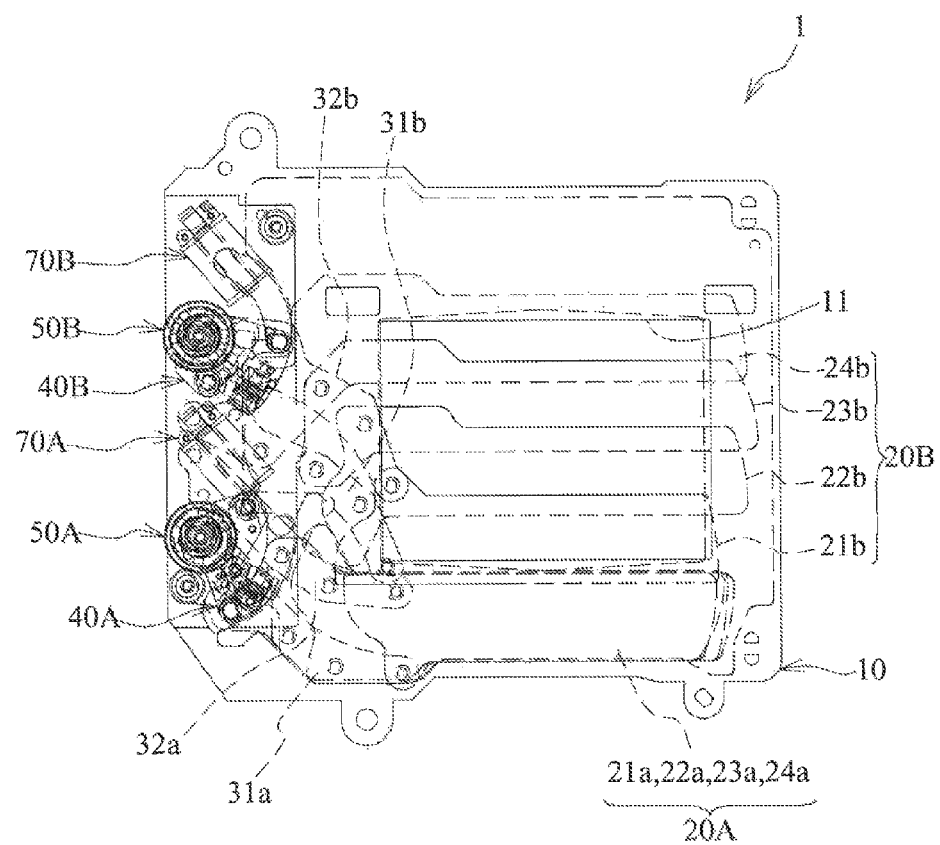
FIG. 1 is a front view of a focal plane shutter according to a present embodiment.

An embodiment will be described later with reference to the drawings. In the embodiment, a focal plane shutter will be described as an example of a blade driving apparatus. FIG. 1 is a front view of the focal plane shutter. As illustrated in FIG. 1, the focal plane shutter 1 includes: a board 10; blades 21a to 24a and 21b to 24b; drive arms 31a, 32a, 31b, and 32b; an electromagnet 70A for leading blades (hereinafter referred to as electromagnet); and an electromagnet 70B for trailing blades (hereinafter referred to as electromagnet). The board 10 is made of a synthetic resin, and includes an opening 11 with a rectangular shape. Each of the blades 21a to 24a and 21b to 24b is made of a synthetic resin and is thinly formed. Also, each of the drive arms 31a, 32a, 31b, and 32b is made of a metal thin plate. Each of the blades 21a to 24a and 21b to 24b move between a position of receding from the opening 11 and a position of covering at least part of the opening 11.

Four blades 21a to 24a configure leading blades 20A. Four blades 21b to 24b configure trailing blades 20B. The leading blades 20A and the trailing blades 20B open and close the opening 11. FIG. 1 illustrates the leading blades 20A in an overlapped state and the trailing blades 20B in an expanded state. In FIG. 1, the leading blades 20A recede from the opening 11 and the trailing blades 20B close the opening 11.

The leading blades 20A are connected to the drive arms 31a and 32a. The trailing blades 20B are connected to the drive arms 31b and 32b. These drive arms 31a, 32a, 31b, and 32b are swingably supported by the board 10.

A leading blades-drive lever 40A (hereinafter referred to as drive lever) for driving the drive arm 31a and a trailing blades-drive lever 40B (hereinafter referred to as drive lever) for driving the drive arm 32b are provided in the board 10. The drive levers 40A and 40B are supported by the board 10 to be swingable in a predetermined range. Specifically, the drive lever 40A is supported to swing about a spindle provided in the board 10. This configuration is applied to the drive lever 40B. The drive levers 40A and 40B drive the leading blades 20A and the trailing blades 20B, respectively. The drive, levers 40A and 40B are each made of a synthetic resin.

The drive arm 31a is connected to the drive lever 40A. The drive arm 32b is connected to the drive lever 40B. The swinging of the drive lever 40A causes the drive arm 31a to swing, thereby moving the leading blades 20A. Likewise, the swinging of the drive lever 40B causes the drive arm 32b to swing, thereby moving the trailing blades 20B. Additionally, the focal plane shutter 1 is provided with a set member that sets the drive levers 40A and 40B at start ends of swingable ranges, respectively. However, the set member is omitted in FIG. 1. The set member will be described later.

The drive levers 40A and 40B each holds an iron piece which does not have a reference numeral. The drive lever 40A can swing between the position where the iron piece abuts the electromagnet 70A and the position where the iron piece recedes from the electromagnet 70A. That is, the drive lever 40A is movable such that the iron piece moves toward and away from the electromagnet. 70A. This is applied to the drive lever 40B.

Also, the drive lever 40A is biased by a spring, not illustrated, in such a direction that the iron piece moves away from the electromagnet 70A. Likewise, the drive lever 40B is biased by a drive spring, not illustrated, in such a direction that the iron piece moves away from the electromagnet 70B.

Ratchet wheels 50A and 50B engage the drive levers 40A and 40B, respectively, through the springs mentioned above. One end of the drive spring, which biases the drive lever 40A in such a direction as to move away from the electromagnet 70A, engages the ratchet wheel 50A. The other end of the drive spring engages the drive lever 40A. The rotational amount of the ratchet wheel 50A is adjusted, thereby adjusting the biasing force of the drive spring. The ratchet wheel 503 also has a function similar to the ratchet wheel 50A.

The electromagnet 70A is energized, thereby adsorbing the iron piece of the drive lever 40A. Likewise, the electromagnet 703 is energized, thereby adsorbing the iron piece of the drive lever 403.

Figure 2:
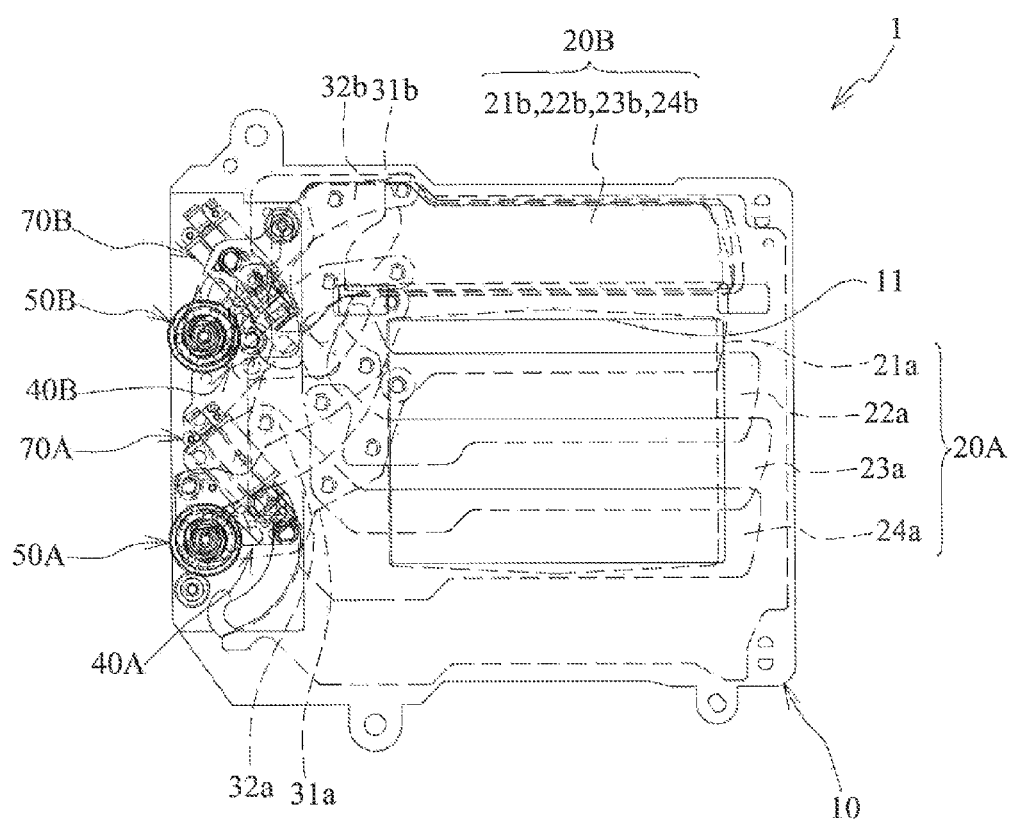
FIG. 2 is an explanatory view of an operation of the focal plane shutter.
Figure 3:
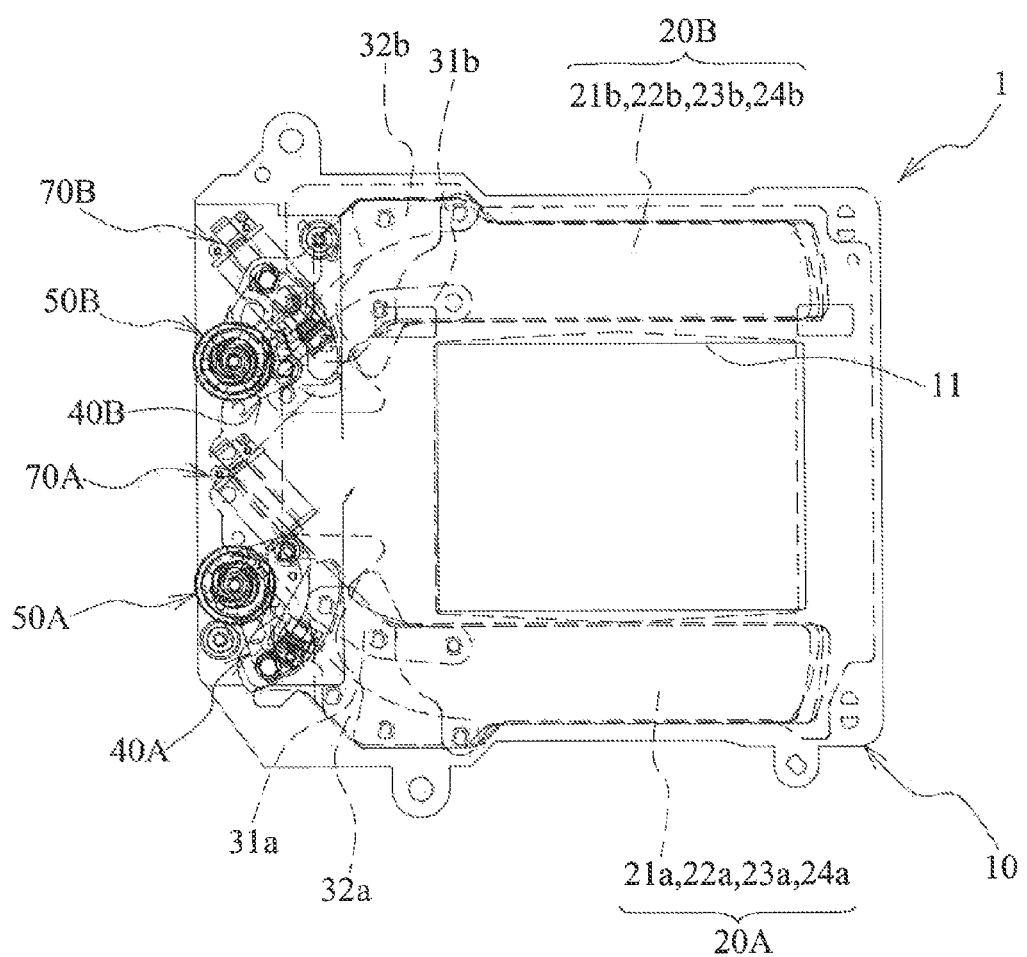
FIG. 3 is an explanatory view of the operation of the focal plane shutter.

Next, the operation of the focal plane shutter 1 will be described. FIGS. 1 to 3 are explanatory views of the operation of the focal plane shutter 1. Here, FIG. 2 illustrates the focal plane shutter 1 in an initial state. In this initial state, the set member not illustrated is secured to an initial position, the leading blades 20A are expanded to close the opening 11, and the trailing blades 203 are overlapped each other to recede from the opening 11. In this initial state, the iron pieces of the drive levers 40A and 403 abut the electromagnets 70A and 703 respectively, and are set to be adsorbed thereto.

In shooting, a release button of the camera is pushed to energize coils of the electromagnets 70A and 70B, whereby the iron piece of the leading blades-drive lever 40A is adsorbed to the electromagnet 70A and the iron piece of the drive lever 403 is adsorbed to the electromagnet 703. After that the set member moves away from the drive levers 40A and 40B. At this time, the drive levers 40A and 403 remain adsorbed to the electromagnets 70A and 703, respectively.

Afterward, the energization of the coil of the electromagnet 70A is stopped, thereby rotating the drive lever 40A clockwise by the biasing force of the drive spring as illustrated in FIG. 3. Therefore, the leading blades 20A move away from the opening 11 to be in the overlapped state. Also, the energization of the coil of the electromagnet 70B remains for a predetermined period, whereas the trailing blades 20B remain away from the opening 11. This causes the opening 11 to be in an opened state. FIG. 3 illustrates an exposed state.

After a predetermined period lapses from a time when the release button is pushed, the energization of the coil of the electromagnet 70B is stopped, and then the drive lever 40B rotates clockwise by the biasing force of the drive spring. Therefore, the trailing blades 20B are expanded to close the opening 11. The drive lever 40B abuts an end portion of the slot formed in the board 10. FIG. 1 illustrates the state just after the exposure operation is finished. In such a way, one cycle of shooting is finished.

Next, the drive levers 40A and 40B are rotated counter-clockwise by the set member not illustrated. Therefore, the leading blades 20A are expanded to close the opening 11 and the trailing blades 20B are overlapped, each other to recede from the opening 11, whereby the state is returned to the initial state illustrated in FIG. 2.

Next, a description will be given of a principle in which the drive lever 40A is adsorbed to and held by the electromagnet 70A. The drive lever 40A holds an iron piece. The drive lever 40A is swingable between the position where the iron piece abuts the electromagnet 70A and the position where the iron piece recedes therefrom. The electromagnet 70A includes an iron core; and a coil wounded around the iron core and energizing the iron core. The energization state of the coil is switched to excite or degauss the iron core. When the coil is energized with the drive lever 40A abutting the iron core of the electromagnet 70A, the magnetic attraction force is generated between the iron piece and the iron core. Therefore, the drive lever 40A is adsorbed to and held by the electromagnet 70A. The energization of the coil is cut to eliminate the magnetic attraction force, and then the drive lever 40A moves away from the drive lever 40A in accordance with the biasing force of the drive spring biasing the drive lever 40A. This principle is applied to a principle where the drive lever 40B is adsorbed to and held by the electromagnet 70B.

Figure 4:
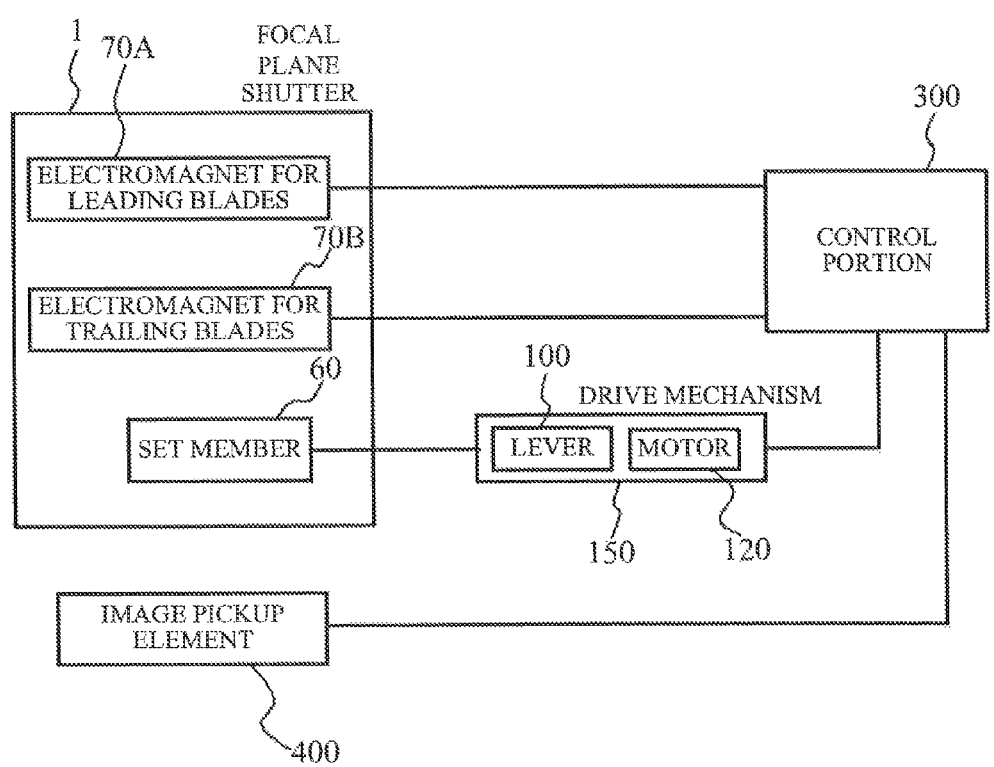
FIG. 4 is a block view of a camera equipped with the focal plane shutter.

A description will be given of a configuration of a camera including the focal plane shutter 1. FIG. 4 is a block diagram of a camera including the focal plane shutter 1. The camera includes: the focal plane shutter 1; a drive mechanism 150; a control portion 300; and an image pickup element 400. The control portion 300 controls an operation of the whole camera and includes a CPU, a ROM, and a RAM. Additionally, the camera includes lenses, not illustrated, for adjusting a focal length.

The control portion 300 controls energization states of the coils of the electromagnets 70A and 70B. The image pickup element 400 changes an object image into electronic signals. The image pickup element 400 is, for example, a CCD or a CMOS. The drive mechanism 150 drives the set member 60 in response to the instruction from the control portion 300.

The drive mechanism 150 includes: a lever 100 driving the set member 60; and a motor 120, capable of reciprocating linearly the lever 100 via a cam as will be mentioned later, and rotatable in forward and reverse directions. The motor 120 is a stepping motor, and causes the cam as will be mentioned later to rotate via gears not illustrated. The control portion 300 controls the driving of the motor 120 to control the lever 100. This controls the rotation of the set member 60. The control portion 300 controls the rotational speed of the motor 120 to control the driving speed of the lever 100. This controls the rotational speed of the set member 60.

Figure 5:
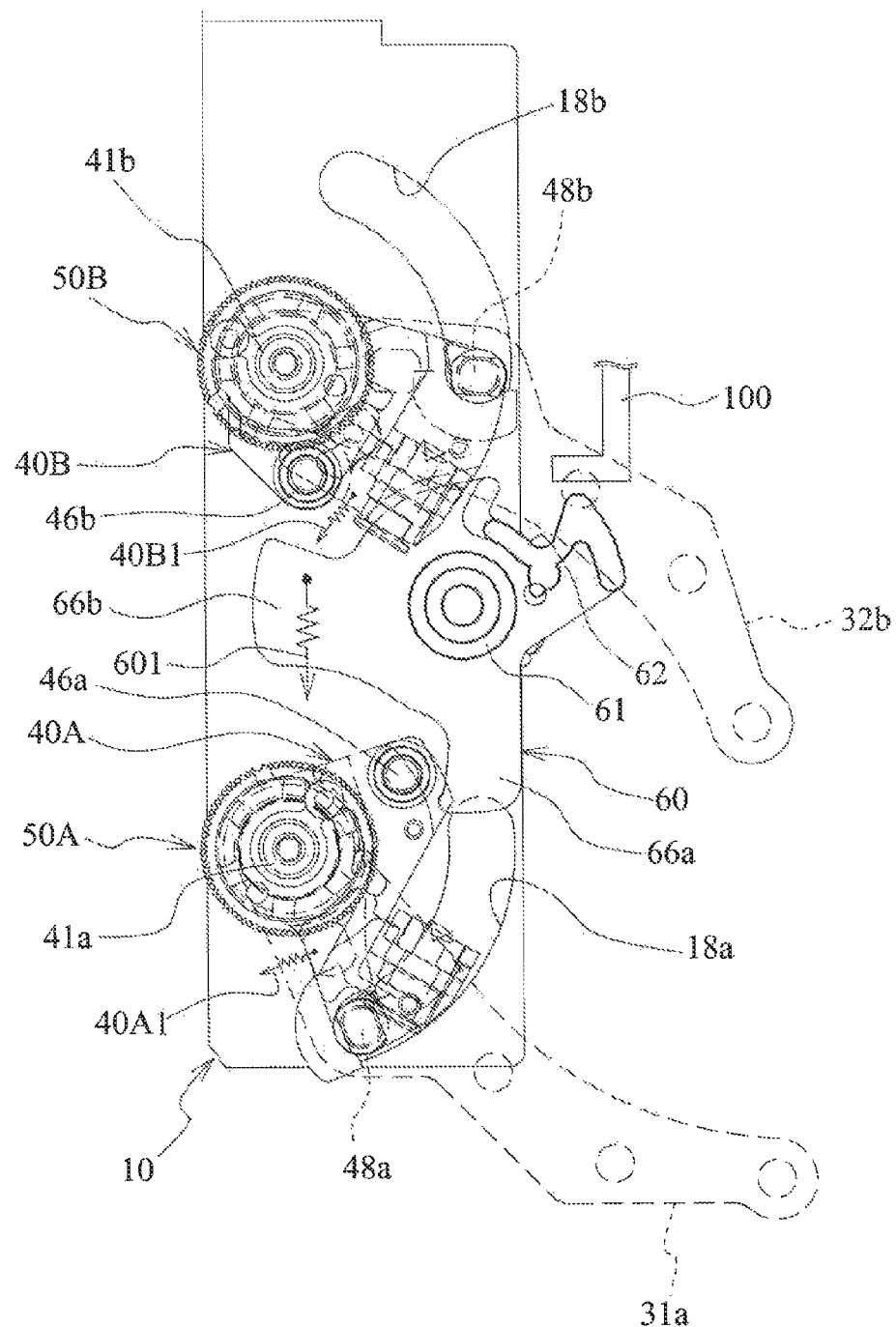
FIG. 5 is an explanatory view of a set member.

The set member 60 will be described. FIG. 5 is an explanatory view of the set member 60. The electromagnets 70A and 70B are omitted in FIG. 5. FIG. 5 illustrates the configuration around the set member 60 in the state illustrated in FIG. 1, FIG. 5 illustrates a state before the set starts.

The set member 60 includes a cylindrical portion 61, a recess portion 62, and pushing portions 66a and 66b. The cylindrical portion 61 is rotatably fitted onto a spindle formed in the board 10.

Therefore, the set member 60 is rotatably supported by the board 10. The set member 60 is biased counterclockwise by a spring 601. A rotational range of the set member 60 is limited by a stopper that is formed in the board 10 and not illustrated. In the state illustrated in FIG. 5, the set member 60 abuts the stopper in accordance with the biasing force of the spring 601.

The lever 100 is provided for linearly reciprocating in a given range. The reciprocation of the lever 100 permits engagement or disengagement with the recess portion 62 of the set member 60. The reciprocation of the lever 100 permits engagement with the recess portion 62 and permits the set member 60 to rotate clockwise or counterclockwise. Herein, the clockwise direction corresponds to a first direction, and the counterclockwise direction corresponds to a second direction.

Figure 11A:
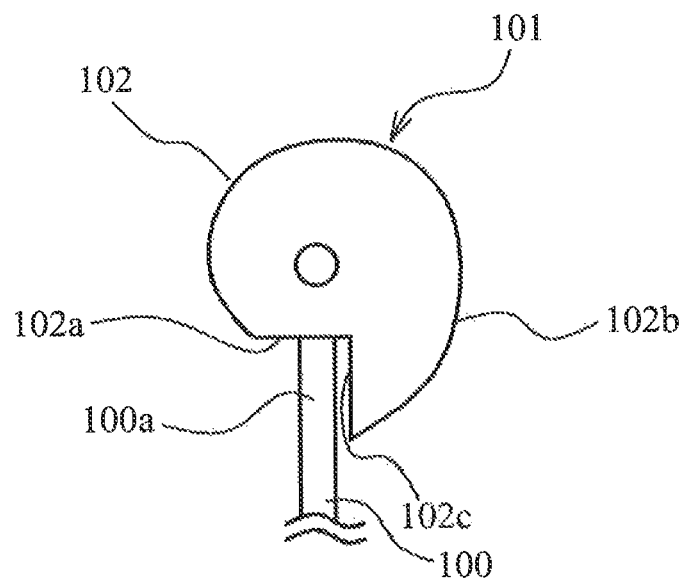
FIGS. 11A and 11B are explanatory views of a structure of a lever.
Figure 11B:
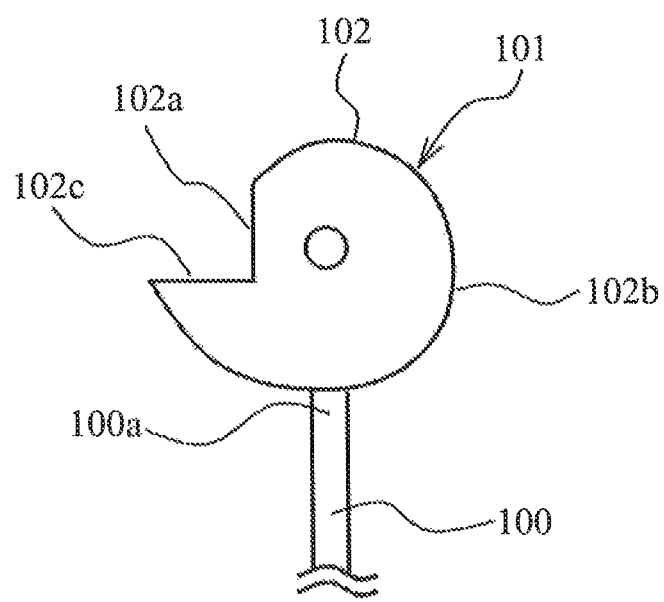

FIGS. 11A and 11B are explanatory views of a drive structure of the lever 100. A drive cam 101 permitting the lever 100 to linearly reciprocate is slidably and rotatably fitted onto a spindle provided in the board 10. The drive cam 101 is driven by the motor 120 via gears not illustrated. An end portion 100a of the lever 100 is biased by a spring not illustrated so as to abut a cam portion 102 provided, at an outer circumferential portion of the drive cam 101, The cam portion 102 includes: a receding cam portion 102a positioning the lever 100 to recede from the set member 60; and an abutting can portion 102b positioning the lever 100 to abut the set member 60, in a state where the stopper not illustrated restricts the set member 60 from rotating counterclockwise as illustrated in FIG. 5. The receding cam portion 102a and the abutting cam portion 102b are continuous with each other through a connecting portion 102c, and are formed at an outer circumferential portion of the drive cam 101. Further, the abutting cam portion 102b is configured such that the movable amount of the lever 100 toward the set member GO gradually increases as the drive cam 101 rotates counterclockwise, and such that the rotational amount of the set member 60 in the clockwise direction is made greater. FIG. 11A illustrates a state where the lever 100 recedes from the set member 60. FIG. 11B illustrates a state where the drive cam 101 rotates counterclockwise and then the lever 100 causes the set member 60 to rotate clockwise to position the drive lever 40A at the start end.

The drive lever 40A includes a cylindrical portion 41a. The cylindrical portion 41a is rotatably and slidably fitted onto a spindle provided in the board 10. Therefore, the drive lever 40A is swingably supported by the board 10. The drive lever 40A includes a drive pin 48a. The board 10 is formed with an escape slot 18a with an are shape. The escape slot 18a escapes the driving of the drive pin 48a. The drive lever 40A is biased toward the other end of the escape slot 18a by the biasing force of a drive spring 40A1. That is, the drive spring 40A1 biases the drive lever 40A to swing clockwise. The other end of the escape slot 18a is provided with a rubber for preventing bounding. The drive pin 48a is fitted into the drive arm 31a. The same structures apply to the drive lever 40B, a cylindrical portion 41b, a drive pin 48b, and an escape slot 18b.

As illustrated in FIG. 5, the drive pin 48a is positioned at the other end of the escape slot 18a, and the drive pin 48b is positioned at the other end of the escape slot 18b. That is, each of the drive levers 40A and, 40B is positioned at the terminal end of the swingable range thereof.

The drive levers 40A and 40B includes rollers 46a and 46b, respectively. The pushing portion 66a pushes the roller 46a of the drive lever 40A to move the drive lever 40A toward the start end. Likewise, the pushing portion 66b pushes the roller 46b of the drive lever 40B to move the drive lever 40B toward the start end.

Next, an operation of the set member 60 will be described. The operation of the set member 60 in a first mode and in a second mode are different from each other. The first mode is for taking a picture. The second mode is for taking moving pictures. The period while the opening 11 is being opened in the second mode is longer than the period while the opening 11 is being opened in the first mode. FIGS. 6 to 9 are explanatory views of the operation of the set member 60. The electromagnets 70A and 70B are omitted in FIGS. 6 to 9. FIGS. 10A and 10B are timing charts illustrating the operations of the set member 60 and the energization states of the electromagnets 70A and 70B. FIG. 10A is a timing chart in the first mode, and FIG. 10B is a timing chart in the second mode.

Figure 6:
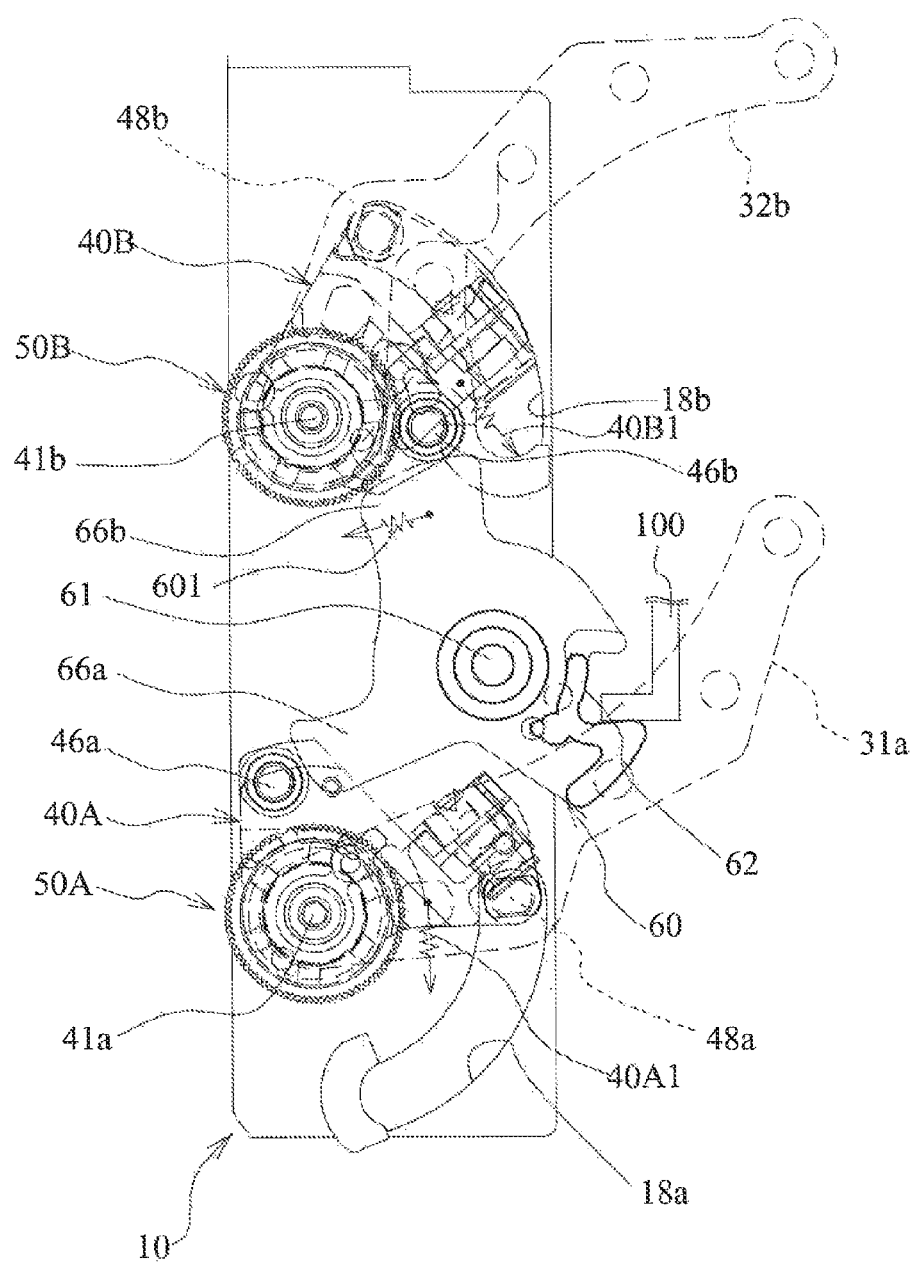
FIG. 6 is an explanatory view of an operation of the set member.

The first mode will be described. The drive cam 101 rotates counterclockwise from the state illustrated in FIG. 11A to abuts the abutting cam portion 102b with the end portion 100a of the lever 100. The lever 100 abuts the set member 60 to rotate the set member 60 clockwise (a first direction) from the state illustrated in FIG. 5. Therefore, the pushing portions 66a and 66b respectively push the rollers 46a and 46b to swing the drive levers 40A and 40B counterclockwise, thereby positioning each of the drive levers 40A and 40B at the start end of the swingable range as illustrated in FIG. 6. While the drive levers 40A and 40B are being respectively positioned at the start ends, both the electromagnets 70A and 70B are energized. Accordingly, the drive levers 40A and 40B are adsorbed to and held by the electromagnets 70A and 70B, respectively. In such a way, the setting of the drive levers 40A and 40B are accomplished. Additionally, as illustrated in FIG. 10A, A2 indicates a value of a sum of consumption. current amounts of the electromagnets 70A and 70B in the first mode.

Figure 7:
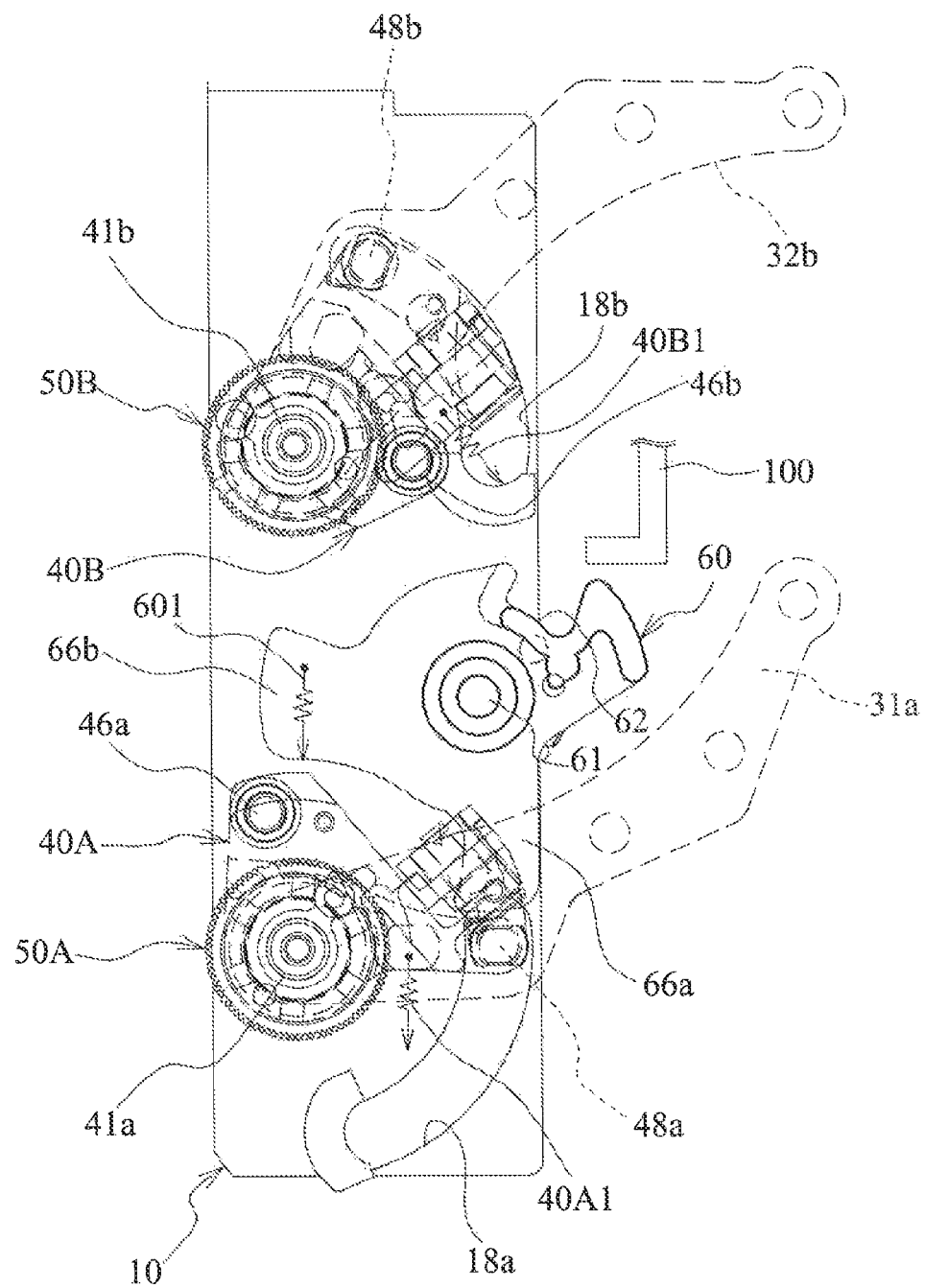
FIG. 7 is an explanatory view of the operation of the set member.

Next, the drive cam 101 further rotates counterclockwise from the state illustrated in FIG. 11B, and the end portion 100a of the lever 100 abuts the receding cam portion 102a through the connecting portion 102e. Therefore, the lever 100 recedes from the set member 60, and then the set member 60 is rotated counterclockwise (a second direction) by the biasing force of the spring 601. Accordingly, the pushing portions 66a and 66b recede from the rollers 46a and 46b respectively, as illustrated in FIG. 7.

Figure 8:
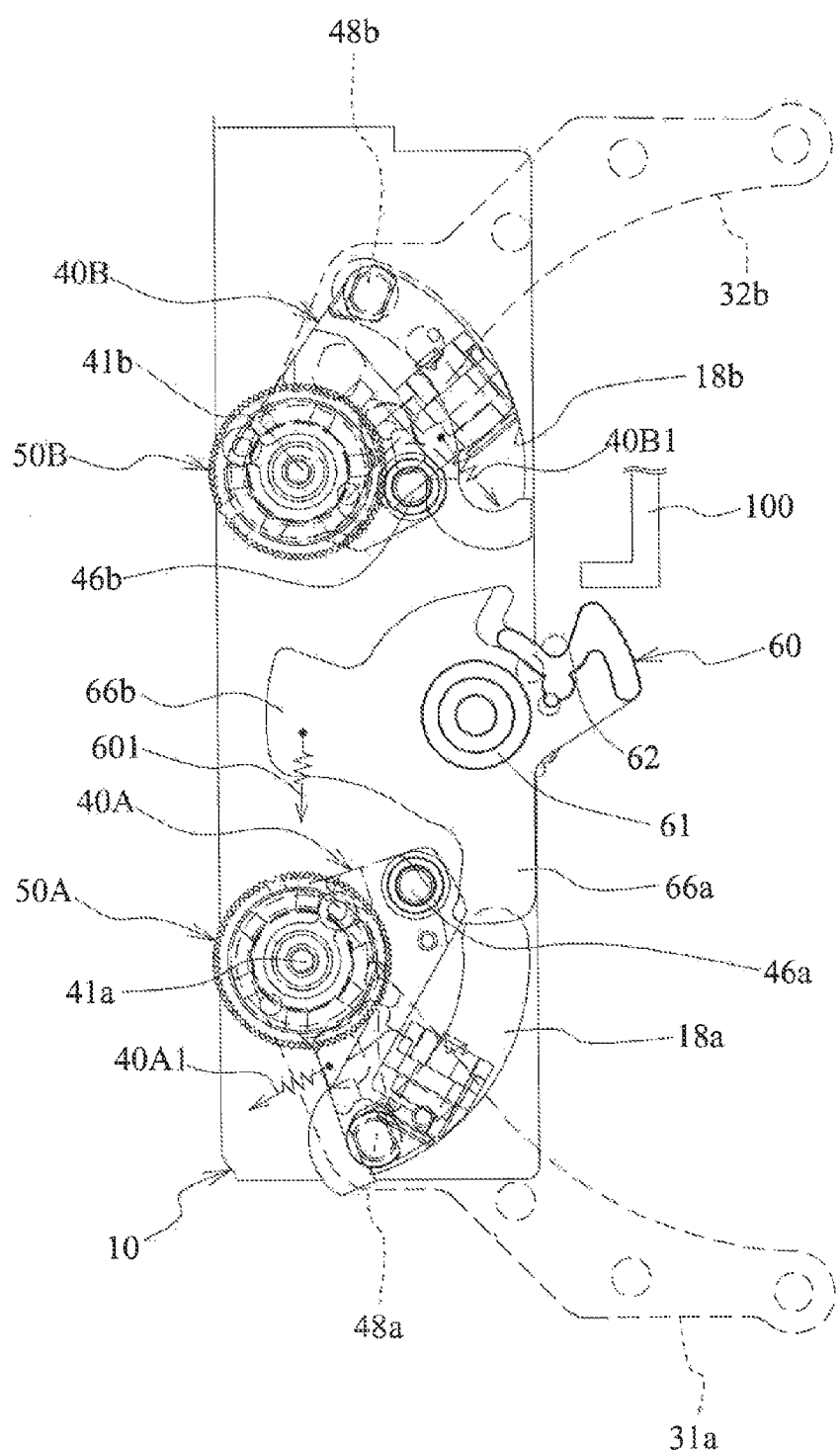
FIG. 8 is an explanatory view of the operation of the set member.

Next, the energization of the electromagnet 70A is cut, after a given period elapses since the set member 60 recedes from the drive levers 40A and 40B. Thus, the drive lever 40A moves from the start end to the terminal end in accordance with the biasing force of the drive spring 40A1 as illustrated in FIG. 8. In such a way, the drive lever 40A moves from the start end to the terminal end while receding from the set member 60 in the first mode. Therefore, the leading blades 20A recede from the opening 11, and the opening 11 is brought into an opened state. As illustrated in FIG. 10A, A1 indicates a value of a consumption current amount of the electromagnet 70B after the energization of the electromagnet 70A is cut.

After a given period elapses since the energization of the electromagnet 70A is cut, the energization of the electromagnet 70B is cut. Therefore, likewise, the drive lever 40B is also moved to the terminal end by a drive spring 40B1 biasing the drive lever 40B for a clockwise swinging movement. Thus, the trailing blades 20B close the opening 11. Accordingly, the focal plane shutter 1 returns to the state illustrated in FIG. 5 again. In the above way, a photo is taken.

Next, a second mode will be described. The drive cam 101 rotates counterclockwise from the state illustrated in FIG. 11A to drive the lever 100, thereby shifting the state into the set state illustrated in FIG. 6. When the set is accomplished, both the electromagnets 70A and 70B are energized, whereby the drive levers 40A and 40B are adsorbed and held at the start ends.

After the set is accomplished, the lever 100 moves and recedes from the set member 60 at the same time when the energization of the electromagnet 70A is cut. As illustrated in FIG. 10B, A1 indicates a value of a consumption current amount of the electromagnet 70B after the energization of the electromagnet 70A is cut. Herein, unlike the first mode, in the second mode, the drive cam 101 rotates clockwise from the state illustrated in FIG. 11B and the lever 100 moves to recede from the set member 60, whereby the set member 60 starts rotating counterclockwise in accordance with the biasing force of the spring 601.

Figure 9:
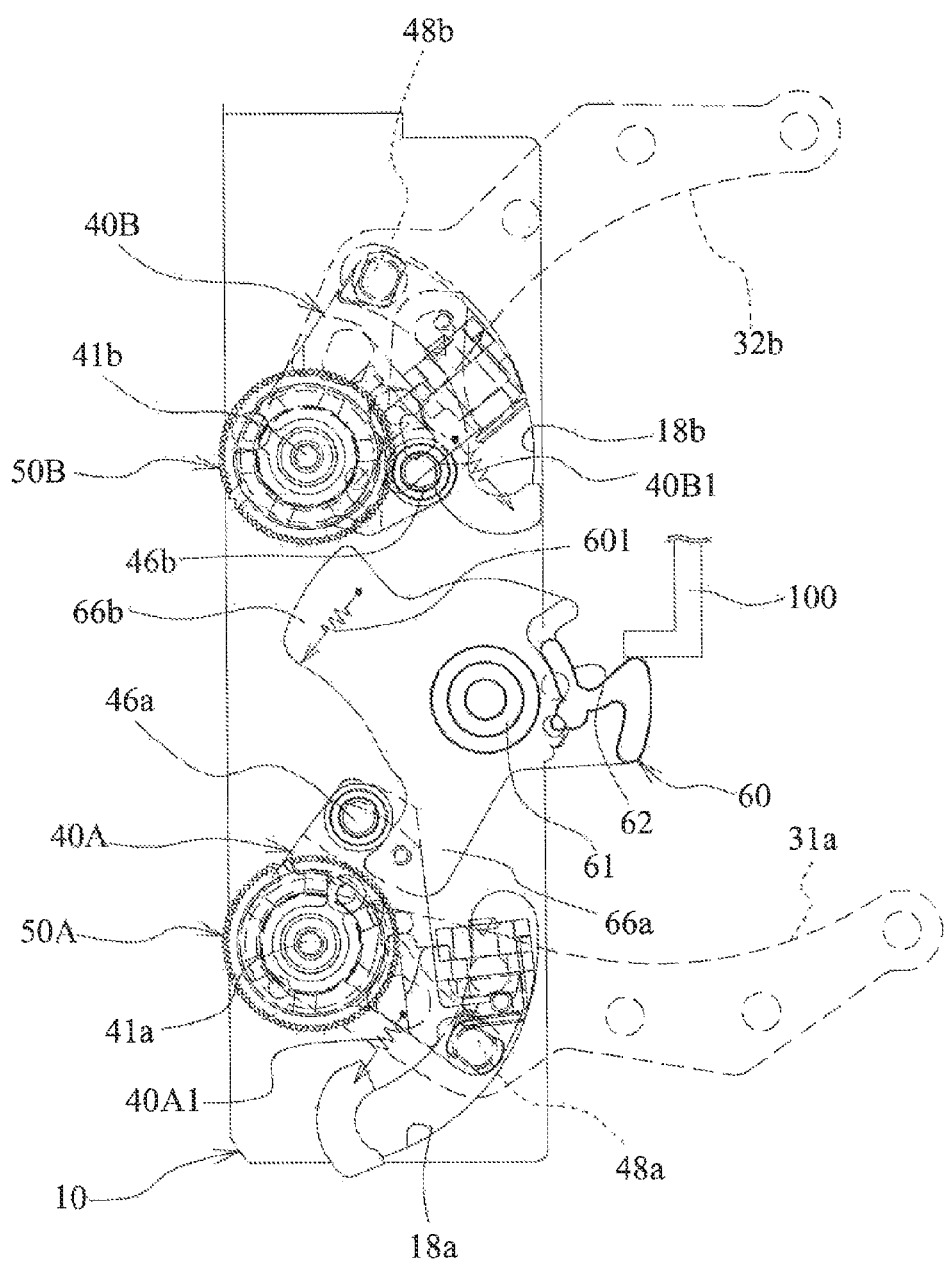
FIG. 9 is an explanatory view of the operation of the set member.

Herein, since the energization of the electromagnet 70A has been already cut, the drive lever 40A starts swinging clockwise in accordance with the biasing force of the drive spring 40A1 in association with the counterclockwise rotation of the set member 60. FIG. 9 illustrates the state where the drive lever 40A swings in association with the rotation of the set member 60. As illustrated in FIG. 9, the set member 60 rotates counterclockwise with abutting the lever 100, whereas the drive lever 40A rotates clockwise with the roller 46a abutting the pushing portion 66a of the set member 60. In this state, the end portion 100a of the lever 100 abuts the abutting cam portion 102b to restrict the lever 100 from linearly moving in such a direction that the lever 100 recedes from the set member 60. Further, the set member 60 abutting the lever 100 is restricted from rotating counterclockwise. For this reason, the clockwise rotational speed of the drive lever 40A is lower in the second mode, in which the drive lever 40A rotates clockwise with abutting the set member 60, than in the first mode, in which, the drive lever 40A moves from the start end to the terminal end in accordance with only the biasing force of the drive spring 40A1. Specifically, the control portion 300 controls the rotational speed of the motor 120 driving the drive cam 101 to control the speed of the lever 100 receding from the set member 60, so that the clockwise rotational speed of the set member 60 is lower in the second mode than in the first mode.

The drive cam 101 further rotates clockwise, and then the lever 100 moves from the state illustrated in FIG. 9 in such a direction to recede from the set member 60. The set member 60 further rotates counterclockwise, and then the drive lever 40A moves to the terminal end of the swingable range. When the set member 60 further rotates counterclockwise, the pushing portion 66a recedes from the roller 46a, and then the set member 60 abuts the stopper in accordance with the biasing force of the spring 601. When the drive cam 101 further rotates clockwise from this state, the end portion 100a of the lever 100 abuts the receding cam portion 102a and then the lever 100 recedes from the set member 60. Therefore, the opening 11 is brought into the opened state, and the energization of the electromagnet 70B is cut in response to an operational instruction, by a user, thereby closing the opening 11 by the trailing blades 20B. A movie is taken in such a way.

As mentioned above, in the second mode, the drive lever 40A moves from the start end to the terminal end with abutting the set member 60. Specifically, while rotating counterclockwise, the set member 60 abuts the lever 100 and the drive lever 40A. In such a way, the drive lever 40A moves to the terminal end in accordance with the biasing force of the drive spring 40A1 in the state where the set member and the lever 100 reduce the biasing force of the drive spring 40A1. In contrast, in the first mode, the energization of the electromagnet 70A is cut after the set member 60 fully recedes from the drive lever 40A, and then the drive lever 40A moves from the start end to the terminal end in accordance with the biasing force of the drive spring 40A1 in the state where the drive lever 40A recedes from the set member 60.

Thus, the swinging speed of the drive lever 40A is lower in the second mode than in the first mode. Therefore, in the second mode, the impact applied to the whole focal plane shutter 1 is suppressed when the drive lever 40A abuts the other end of the escape slot 18a to stop. This can reduce the load applied to the drive lever 40A and the whole focal plane shutter 1. It is thus possible to suppress the damage of the drive lever 40A and the other end of the escape slot 18a caused by abutting the drive lever 40A with the escape slot 18a, and to ensure the reliability of the performance of the focal plane shutter 1 for long-term use.

As illustrated in FIGS. 10A and 10B, the consumption current value A1' in the second mode is set lower than the consumption current value A1 in the electromagnet 70B in the first mode. In the first mode, the drive lever 40A rotates in accordance with the biasing force of the drive spring 40A1 without reducing the speed of the drive lever 40A. For this reason, in the first mode, a large impact is applied to the focal plane shutter 1, when the drive lever 40A abuts the end portion of the escape slot 18a to stop. Even when such an impact is applied to the whole focal plane shutter 1, it is necessary to maintain the state where the drive lever 40B is adsorbed to and held by the electromagnet 70B. Herein, the adsorption force of the electromagnet 70B to the drive lever 40B is substantially proportional to a consumption current amount of the electromagnet 70B. For this reason, the amount of current in the electromagnet 70B is set so as to adsorb and hold the drive lever 40B even when the impact is applied to the focal plane shutter 1. Thus, the consumption current value A1 in the electromagnet 70B is set to be large.

However, in the second mode, the impact applied to the focal plane shutter 1 is suppressed when the drive lever 40A abuts the end portion of the escape slot 18a and stops. It is therefore possible to set the consumption current value A1' in the electromagnet 70B for adsorbing and holding the drive lever 40B to be lower than the consumption current value A1. In such a way, the electricity consumption of the electromagnet 70B is lower in the second mode than in the first mode. Consequently, the electricity consumption of the focal plane shutter 1 is reduced.

The traveling speed of the leading blades 20A is lower in the second mode than in the first mode. Thus, the first mode in which the traveling speed of the leading blades 20A is demanded prioritizes the speed of the drive lever 40A, and the second mode in which the traveling speed of the leading blades 20A is not demanded prioritizes the suppression of the impact to the focal plane shutter 1.

While the exemplary embodiments of the present invention have been illustrated in detail, the present invention is not limited to the above-mentioned. embodiments, and other embodiments, variations and modifications may be made without departing from the scope of the present invention.

The focal plane shutter according to the present embodiment can be employed in an optical apparatus such as a still camera or a digital camera.

The above embodiment describes the first mode and the second mode that are different in the rotational speed of the set member 60 after the drive lever 40A is positioned at the start end. However, in the second mode, it is only necessary for the set member 60 to abut the lever 100 and to rotate with abutting the drive lever 40A swinging from the start end to the terminal end. The counterclockwise rotational speed of the set member 60 may be the same in the first mode and the second mode.

In the above embodiment, in the second mode, the drive lever 40A moves from the start end to the terminal end while abutting the set member 60. However, the drive lever 40A may move while abutting the set member 60 from the start end to a partway position between the start end and the terminal end. This can suppress the impact when the drive lever 40A abuts the other end of the escape slot 18a and then stops, thereby setting the amount of current in the electromagnet 70B to be lower than the consumption current value A1 in the first mode, The above embodiment describes, in the second mode, the electromagnets 70A and 70B that are energized to respectively adsorb the drive levers 40A and 40B at the start ends after the set operation is finished by the lever 100. However, only the electromagnet 70B may be energized to have the consumption current value A1' for adsorbing and holding the drive lever 40B at the start end.

The above embodiment describes the set member 60 that rotates in the first direction or the second direction in response to the reciprocation of the lever 100. However, the set member 60 may rotate in the first direction or the second direction in response to forward or reverse driving of a motor.

Finally, several aspects of the present invention are summarized as follows.

According to an aspect of the present invention, there is provided a focal plane shutter including: a board including an opening; a drive lever swingably supported by the board, biased from a start end to a terminal end of a swingable range by a drive spring, and driving blades opening and closing the opening; and a set member rotating in a first direction to position the drive lever at the start end, and then rotating in a second direction; wherein the drive lever moves from the start end to the terminal end, while the drive lever is abutting the set member rotating in the second direction so as to reduce a biasing force of the drive spring, the blades include, leading blades and trailing blades, the drive lever includes a leading blades drive lever and a trailing-blades drive lever respectively driving the leading blades and the trailing blades, the trailing-blades drive lever is adsorbed to and held by an electromagnet for the trailing blades, the leading-blades drive lever moves from the start end to the terminal end, while the leading-blades drive lever is abutting the set member rotating in the second direction so as to reduce the biasing force of the drive spring, the set member is rotatable in the second direction in first and second modes different from each other, the leading-blades drive lever moves from the start end to the terminal end while being spaced from the set member in the first mode, the leading-blades drive lever moves from the start end to the terminal end while abutting the set member in the second mode, and an amount of current: in the electromagnet for the trailing blades is set lower in the second mode than in the first mode. This can suppress the impact caused when the drive lever rotates from the start end to the terminal end by the drive spring to stop at the terminal end.

According to another aspect of the present invention, there is provided an optical apparatus including the above focal plane shutter.

What is claimed is:

1. A focal plane shutter comprising:
a board including an opening;
a drive lever swingably supported by the board, biased from a start end to a terminal end of a swingable range by a drive spring, and driving blades opening and closing the opening; and
a set member rotating in a first direction to position the drive lever at the start end, and then rotating in a second direction;
wherein the drive lever moves from the start end to the terminal end, while the drive lever is abutting the set member rotating in the second direction so as to reduce a biasing force of the drive spring,
the blades include leading blades and trailing blades,
the drive lever includes a leading-blades drive lever and a trailing-blades drive lever respectively driving the leading blades and the trailing blades,
the trailing-blades drive lever is adsorbed to and held by an electromagnet for the trailing blades,
the leading-blades drive lever moves from the start end to the terminal end, while the leading-blades drive lever is abutting the set member rotating in the second direction so as to reduce the biasing force of the drive spring,
the set member is rotatable in the second direction in first and second modes different from each other,
the leading-blades drive lever moves from the start end to the terminal end while being spaced from the set member in the first mode,
the leading-blades drive lever moves from the start end to the terminal end while abutting the set member in the second mode, and
an amount of current in the electromagnet for the trailing blades is set lower in the second mode than in the first mode.

2. A focal plane shutter comprising:
a board including an opening;
a drive lever swingably supported by the board, biased from a start end to a terminal end of a swingable range by a drive spring, and driving blades opening and closing the opening; and
a set member rotating in a first direction to position the drive lever at the start end, and then rotating in a second direction;
wherein the drive lever moves from the start end to the terminal end, while the drive lever is abutting the set member rotating in the second direction so as to reduce a biasing force of the drive spring,
the blades include leading blades and trailing blades,
the drive lever includes a leading-blades drive lever and a trailing-blades drive lever respectively driving the leading blades and the trailing blades,
the trailing-blades drive lever is adsorbed to and held by an electromagnet for the trailing blades,
the leading-blades drive lever moves from the start end to the terminal end, while the leading-blades drive lever is abutting the set member rotating in the second direction so as to reduce the biasing force of the drive spring,
the set member is rotatable in the second direction in first and second modes different from each other,
the leading-blades drive lever moves from the start end to the terminal end while being spaced from the set member in the first mode,
the leading-blades drive lever moves from the start end to the terminal end while abutting the set member in the second mode, and
a rotational speed of the set member in the second direction is lower in the second mode than in the first mode.

3. A focal plane shutter comprising:
a board including an opening;

a drive lever swingably supported by the board, biased from a start end to a terminal end of a swingable range by a drive spring, and driving blades opening and closing the opening; and a set member rotating in a first direction to position the drive lever at the start end, and then rotating in a second direction;

wherein the drive lever moves from the start end to the terminal end, while the drive lever is abutting the set member rotating in the second direction so as to reduce a biasing force of the drive spring, the blades include leading blades and trailing blades, the drive lever includes a leading-blades drive lever and a trailing-blades drive lever respectively driving the leading blades and the trailing blades, the trailing-blades drive lever is adsorbed to and held by an electromagnet for the trailing blades, the leading-blades drive lever moves from the start end to the terminal end, while the leading-blades drive lever is abutting the set member rotating in the second direction so as to reduce the biasing force of the drive spring, the set member is rotatable in the second direction in first and second modes different from each other, the leading-blades drive lever moves from the start end to the terminal end while being spaced from the set member in the first mode, the leading-blades drive lever moves from the start end to the terminal end while abutting the set member in the second mode, and a period while the opening is being opened is longer in the second mode than in the first mode.

4. The focal plane shutter of claim 1, wherein the set member abuts a lever reciprocated by a motor via a cam, and rotates in the first direction or the second direction in response to reciprocation of the lever.

5. The focal plane shutter of claim 2, wherein the set member abuts a lever reciprocated by a motor via a cam, and rotates in the first direction or the second direction in response to reciprocation of the lever.

6. The focal plane shutter of claim 3, wherein the set member abuts a lever reciprocated by a motor via a cam, and rotates in the first direction or the second direction in response to reciprocation of the lever.

7. An optical apparatus comprising a focal plane shutter, the focal plane shutter comprising:

a board including an opening;

a drive lever swingably supported by the board, biased from a start end to a terminal end of a swingable range by a drive spring, and driving blades opening and closing the opening; and a set member rotating in a first direction to position the drive lever at the start end, and then rotating in a second direction;

wherein the drive lever moves from the start end to the terminal end, while the drive lever is abutting the set member rotating in the second direction so as to reduce a biasing force of the drive spring, the blades include leading blades and trailing blades, the drive lever includes a leading-blades drive lever and a trailing-blades drive lever respectively driving the leading blades and the trailing blades, the trailing-blades drive lever is adsorbed to and held by an electromagnet for the trailing blades, the leading-blades drive lever moves from the start end to the terminal end, while the leading-blades drive lever is abutting the set member rotating in the second direction so as to reduce the biasing force of the drive spring, the set member is rotatable in the second direction in first and second modes different from each other, the leading-blades drive lever moves from the start end to the terminal end while being spaced from the set member in the first mode, the leading-blades drive lever moves from the start end to the terminal end while abutting the set member in the second mode, and an amount of current in the electromagnet for the trailing blades is set lower in the second mode than in the first mode.

* * * * *